ular groove
United States Patent [19]
Winquist

[11] 3,996,963
[45] Dec. 14, 1976

[54] ATOMIZING NOZZLE WITH LATERALLY MOVABLE SEAT

[75] Inventor: Knut Ludvig Winquist, Elmira, N.Y.

[73] Assignee: Clean Air Company, Inc., "CASCA", Panama

[22] Filed: Nov. 12, 1974

[21] Appl. No.: 523,075

[30] Foreign Application Priority Data

Oct. 9, 1974   Sweden .................. 7412673

[52] U.S. Cl. .................. 137/529; 137/543.17; 239/453; 261/37
[51] Int. Cl.² .................. F16K 15/02
[58] Field of Search .................. 137/529, 543.17; 239/451, 452, 453, 459, 506, 514, 515, 516, 518; 261/37

[56] References Cited
UNITED STATES PATENTS

| 1,041,708 | 10/1912 | Anderson | 137/529 X |
| 1,087,890 | 2/1914 | Rogers | 137/529 X |
| 1,112,416 | 9/1914 | Sargent | 239/453 |
| 2,536,505 | 1/1951 | Kircher | 137/529 |
| 2,874,000 | 2/1959 | Nystrom | 239/453 X |
| 3,039,699 | 6/1962 | Allen | 239/453 |
| 3,289,686 | 12/1966 | Tyer, Jr. | 137/529 X |
| 3,336,942 | 8/1967 | Keith et al. | 137/543.17 X |
| 3,421,701 | 1/1969 | Walters | 239/453 |
| 3,510,112 | 5/1970 | Winquist et al. | 239/453 |

*Primary Examiner*—William R. Cline
*Attorney, Agent, or Firm*—Stevens, Davis, Miller & Mosher

[57] ABSTRACT

A nozzle for atomizing a liquid which includes a nozzle housing, a nozzle body supported in an annular groove of the nozzle housing which body defines a nozzle orifice and a valve body which coacts with the nozzle orifice to close and open the orifice by movement of the valve body along a line through the center of the orifice. The nozzle body is movable in the groove in a lateral direction relative to the direction of the opening and closing movement of the valve body.

8 Claims, 2 Drawing Figures

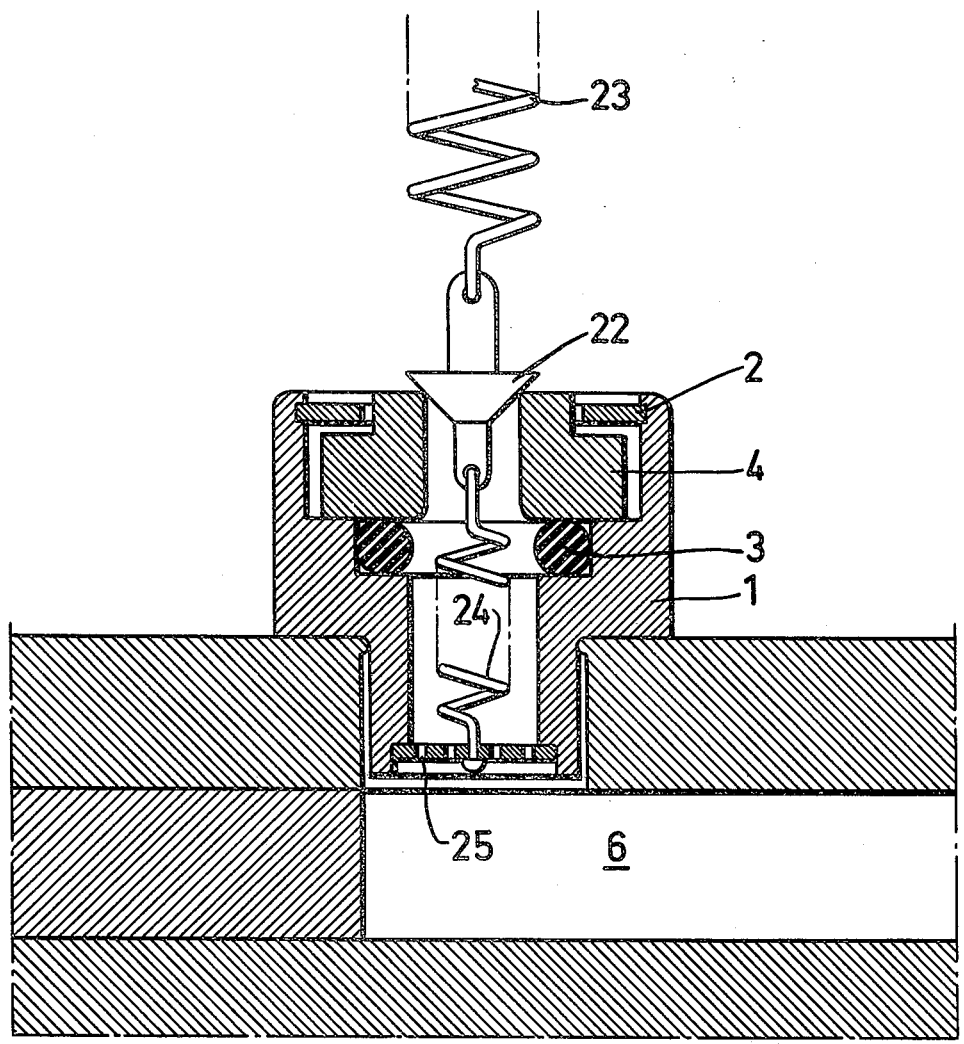

ATOMIZING NOZZLE WITH LATERALLY MOVABLE SEAT

BACKGROUND OF THE INVENTION

Of known types of nozzles, it is very difficult to effect a uniform spray of the fluid to be passed through the nozzle, e.g. gasoline in a carburetor nozzle, fuel oil in a burner nozzle, spraying liquid in a plant spray apparatus. These difficulties are accentuated particularly in nozzles of the kind where the nozzle orifice coacts with a valve body, the object of which may be to effect an adjustment of the flow amount through the nozzle, an atomization of the liquid or a combination of both adjustment and atomization.

The difficulty of obtaining an efficient operation with such a nozzle is due to the fact, that the valve body must assume a position centered accurately in relation to the nozzle orifice. At the slightest lateral displacement of the valve body, a larger amount of liquid will be sprayed in the direction of the widest annular gap between the valve body and the valve seat. When the annular gap, due to an unsatisfactory centering of the valve body, is able to vary from a position of the valve body abutting one side of the nozzle orifice, to a position of the valve body aligning with the center of the nozzle orifice, the adjustment function will be unstable. In spite of the fact, that the flow area in both said cases can be accurately equal, and all other circumstances, for example the pressure of the fluid supplied, can be identical, the flow amount knowingly will be much greater in the first mentioned case than in the last mentioned one.

SUMMARY OF THE INVENTION

During the development work with a carburetor according to a conventional arrangement, it was one of the major problems to obtain a good stability of the fuel flow just because of the difficulties in obtaining in a simple way a sufficiently stable centering of the valve body relative to the nozzle orifice.

The present invention, eliminates the aforementioned difficulties, by means, which are of simple design and operate more efficiently than conventional means. The present invention provides lateral movement of the valve body and nozzle orifice relative to their opening and closing so that the valve body is always aligned with the nozzle orifice.

BRIEF DESCRIPTION OF THE DRAWINGS

One embodiment of the invention is shown in the accompanying

FIG. 2 shows a second embodiment of the invention, also this in conjunction with a carburetor. Both said Figures are sections through the longitudinal axis of the nozzles.

DESCRIPTION OF THE PREFERRED EMBODIMENTS

Figure 1:
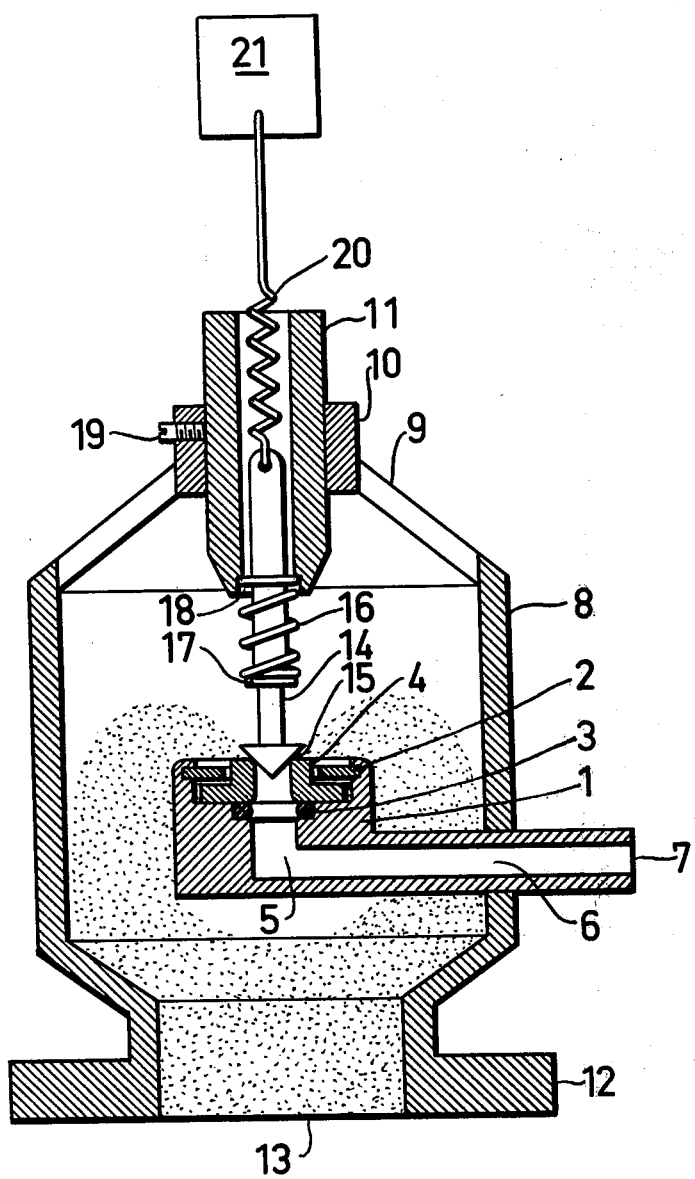
FIG. 1, which also shows an arrangement comprising the invention as a component in a device adapted for use, for example, as a carburetor for an internal combustion engine, in a device for an oil burner, etc. The accompanying

In FIG. 1 is shown a nozzle housing 1, a shoulder plate 2, an elastic sealing ring 3 and a nozzle body 4. The inner cavity 5 of the nozzle body communicates by a passageway 6 with a pipe 7, through which the fluid in question is supplied to the nozzle.

For the following description of the invention it was found suitable to select as an example the case where the invention is utilized as a component in a carburetor. In the embodiment shown in FIG. 1, the invention is disposed in the center of a circular carburetor housing 8, the upper portion of which is provided with apertures 9 for air supply and a guide member 10, in which a bushing 11 is mounted movable along the vertical center line of the carburetor. The lower portion of said carburetor housing comprises a flange 12 and includes an aperture 13 for the fuel-air mixture flowing out from the carburetor when in operation. A valve body 14 provided in the carburetor housing comprises a lower portion in the form of a cone, which is pressed against the orifice 15 in the nozzle body 4 by a compression spring 16 clamped between a shoulder 17 on the valve body and a shoulder 18 in said bushing 11. The tension of the spring 16, and thereby the initial force by which the valve body is pressed against the nozzle orifice, can be adjusted by movement of the bushing 11. The bushing 11 is thereby locked in its position by means of a stop screw 19. The upper portion of the valve body is fastened to a tension spring 20, the other end of which is attached to an adjusting member 21 intended to vary the tension in said spring 20. It is easily understood that hereby the force, by which the valve body is pressed against the nozzle orifice, is dependent on the setting of the adjusting member, which can be fed with control impulses from a sensing member, for example of the kind sensing the air amount entering through the apertures 9.

A known device comprising an arrangement of a nozzle and a valve body as described above, thus, operates in such a manner that the flow amount through the nozzle is obtained as a stable function of the force, by which the valve body is pressed against the nozzle orifice. In the present case, the resulting function obtained is a fuel-air mixture, in which the amounts of fuel and air always are in a definite relation to each other which, however, need not be constant.

Fuel is supplied through the pipe 7 via the passageway 6 to the cavity 5 within the nozzle housing by means of a pulsating pressure. Upon the production of such a pressure pulse, the sealing ring 3 is pressed outward in radial direction, and the nozzle body 4 is pressed upward by the fuel pressure directly acting from below and by the deformation effectuated by the fuel pressure on the elastic sealing ring, which still is pressed against the lower surface of the nozzle body. The outer upper surface of the nozzle body is pressed against the lower surface of the shoulder plate 2.

The valve body so far has closed the nozzle orifice 15, because the fuel pressure has been active over the area of the lower surface of the nozzle body which is defined by the sealing ring 3, which area exceeds in size the area of the nozzle orifice closed by the valve body. However, the fuel pressure continues to increase to an amount, at which the pressure force on the lower surface of the valve body exceeds the force, by which the valve body is pressed by the spring force against the nozzle orifice. The valve is hereby lifted from the nozzle orifice.

The valve body 14 is aligned by the downwardly directed force from the compression spring 16 acting against the shoulder 17 of the valve body, which shoulder is located substantially lower than the point, in which the upwardly directed force from the tension spring 20 is acting on the valve body. It is easy to understand that the valve body, when no other forces act upon it, always will be aligned in the force line formed by the downwardly directed force from the compression spring and the upwardly directed force from the tension spring.

As stated earlier, the fuel is supplied with a pulsating pressure. It also should be apparent from the aforesaid that, as long as the fuel pressure during such a pressure pulse is of a certain amount, a gap opening is obtained between the valve body and the nozzle orifice which permits the outflow of fuel. At the end of a pressure pulse, when the fuel pressure is dropping rapidly, the valve body again is pressed against the orifice in the nozzle body 4. If then the valve body is not centered accurately in relation to the orifice 15 in the nozzle body 4, the valve body 14 will exert a force on the nozzle body 4 tending to laterally displace said body so that the nozzle orifice 15 is centered relative to the valve body. The pressure drop at a pressure pulse of the fuel takes place very rapidly, which implies that at the same time as the valve body meets the nozzle orifice, the fuel pressure no longer produces any force. The nozzle body 4 in its upper portion has an outer diameter, which is smaller than the opening in the surrounding shoulder plate 2, and in its lower portion is formed with a projecting flange, the outer diameter of which is smaller than the surrounding cavity. Said flange has a thickness smaller than the distance between the lower surface of the shoulder plate 2 and the upper surface of the sealing ring 3. Owing to this design, there arise no or only very insignificant forces preventing, upon movement of the system valve body/nozzle plate from its uppermost position down to the starting position (abutment to the sealing ring 3), a required movement in lateral direction of the nozzle body 4 for centering the nozzle orifice 15 relative to the centre of the valve body. It is to be noticed that the above-mentioned pressure pulses of the fuel flow have a relatively high frequency, which also implies that an automatic centering of nozzle orifice/valve body perpetually takes place at very short intervals. It may be mentioned that a device according to the invention has been tested in practice for different frequencies of pressure pulses in the fuel flow, from about 50 cps up to about 200 cps. At many times repeated tests the device has proved to effect a uniformly distributed spray and a perfect stability with respect to the reproducibility of flow amounts at different tensions in the tension spring 20.

The carburetor shown in the drawing operates in other respects as follows. The flange 12 is connected to a throttle housing with damper, which is connected to the inlet pipe of an internal combustion engine. When the throttle opens, air is sucked in through the apertures 9 in the carburetor housing. The air amount is sensed by means of a sensing member (not shown). This sensing may take place in many different ways, for example by sensing the pressure difference before and after the apertures 9. The control signal from the sensing member is transferred to the adjusting device 21 and converted into a movement, which sets the tension of the spring 20 and thereby adjusts in the aforedescribed manner the fuel flow to an amount corresponding correctly to the air amount sucked in. The air flow meets the fuel droplets sprayed in from and atomized by the nozzle. This results in an effective mixture of the fuel and air, which mixture continues to flow through the aperture 13 to the throttle housing and inlet pipe of the internal combustion engine.

In FIG. 2 a second embodiment is shown which comprises, as before, a nozzle housing 1, a shoulder plate 2, an elastic sealing ring 3 and a nozzle body 4. The inner cavity 5 of the nozzle housing 1 communicates with a passageway 6, to which the liquid to be atomized is supplied. The valve body 22 abuts the orifice 15 in the nozzle body. These parts operate in the manner described above. Distinguished from the first embodiment, the springs 23 and 24 are arranged on both sides of the valve body, and the strongest spring 24 (lowermost) is attached to a perforated disk 25 mounted in the cavity 5, so that liquid can pass through said disk. The spring 23 is attached to an adjusting device (not shown) in the same manner as at the first embodiment.

It is understood from the above description that the invention shows great advantages over conventional devices. The dimensions of the nozzle shown in the Figures are exaggerated in relation to the remaining parts of the carburetor, but this was necessary for illustrating its structure sufficiently clearly. In conventional arrangements the nozzle includes a stationary orifice, and the valve body is centered relative to the orifice by means of a guide member carried out carefully about the rod of the valve body. As the valve body is pressed against the nozzle orifice by means of a spring or some other arrangement being resilient in like manner, it is understood that further problems will arise when the force line from such a spring which, moreover, can change at different tensions of the spring, is to coincide with the center line for a stationary nozzle orifice. Such a desired arrangement, as can be easily understood, is almost impossible to realize in practice. In the aforementioned guide member about the rod of the valve body, for example, frictional forces will arise which render impossible a stable adjustment of the flow amounts through the nozzle, because said forces always vary, and in most cases to a high degree. Such frictional forces are entirely eliminated by a device according to the invention, as also is apparent from the above description. It would, moreover, involve unreasonably high production costs to make a guide member about the valve body rod with such a precision as required for bringing the center line of the valve as closely to the center line of the nozzle orifice as required for effecting a satisfactorily uniform spray of the fuel.

The valve body described above comprises a conical portion for coaction with the nozzle orifice. The valve body, however, may also be given other suitable shapes and, for example, comprise a spherical portion coacting with the nozzle orifice. The invention, further, has been described in conjunction with fuel supply at pulsating pressure. The invention, however, is also applicable in such arrangements where the fuel is supplied at constant pressure, and the desired vibrations (reciprocatory movement to the valve seat) are effected by means of a vibration-producing member actuating the valve body.

What I claim is:

1. A nozzle for atomizing a liquid, comprising a nozzle housing having an annular groove, a nozzle body formed with a nozzle orifice, said nozzle body being supported in said annular groove of said nozzle housing, and a valve body coacting with said nozzle orifice to close and open said orifice by movement of said valve body along a line through the center of said orifice, said nozzle body and annular groove dimensions being selected so that said nozzle body is freely movable in said groove in a lateral direction relative to the direction of the opening and closing movement of the valve body and said valve body having support means which support the valve body to be freely movable in said same lateral direction to permit alignment with said nozzle body.

2. The nozzle as defined in claim 1, wherein the nozzle body has free movement a restricted distance in the same direction as the direction of the opening and closing movement of the valve body.

3. The nozzle as defined in claim 2, wherein the nozzle body has the shape of an annular disk positioned with clearance in all directions into said annular groove in the nozzle housing.

4. The nozzle as defined in claim 2, including a sealing ring located in said groove and abutting said nozzle body surrounding said orifice, so that the nozzle body is pressed against said ring when the valve body is pressed against the valve seat.

5. The nozzle as defined in claim 1, wherein the nozzle body has the shape of an annular disk positioned with lateral clearance into said annular groove in the nozzle housing.

6. The nozzle as defined in claim 1, wherein said support means includes two counteracting springs engaging a spindle at two spaced points along said spindle, said spindle forming a part of said valve body, said points being spaced in the direction of the spindle, but disposed so that the resultants of the reaction forces in the engagement points coincide with the geometric axis of the valve body.

7. The nozzle as defined in claim 6, including a bushing surrounding said spindle with one of said springs being a tension spring engaging the free end of the spindle, and the other of said springs being a compression spring clamped between the end of the bushing facing toward the valve orifice and a shoulder on the spindle.

8. A nozzle as defined in claim 6, wherein the springs are located on both sides of the valve body.

* * * * *